United States Patent
Chi et al.

(10) Patent No.: US 10,678,363 B2
(45) Date of Patent: Jun. 9, 2020

(54) PRESSURE SENSOR AND DISPLAY DEVICE

(71) Applicant: TPK Touch Solutions (Xiamen) Inc., Xiamen (CN)

(72) Inventors: Ho-Hsun Chi, Hsinchu County (TW); Cheng-Chung Chiang, Kaohsiung (TW); Feng Chen, Fuzhou (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 0 days.

(21) Appl. No.: 15/876,197

(22) Filed: Jan. 21, 2018

(65) Prior Publication Data
US 2018/0210601 A1    Jul. 26, 2018

(30) Foreign Application Priority Data
Jan. 21, 2017    (CN) .......................... 2017 1 0044609

(51) Int. Cl.
*G06F 3/045*    (2006.01)
*G06F 3/041*    (2006.01)

(52) U.S. Cl.
CPC ............ *G06F 3/0414* (2013.01); *G06F 3/045* (2013.01); *G06F 3/0412* (2013.01)

(58) Field of Classification Search
CPC ....... G06F 3/0414; G06F 3/0412; G06F 3/045
See application file for complete search history.

(56) References Cited

U.S. PATENT DOCUMENTS

| | | | | |
|---|---|---|---|---|
| 2009/0122021 A1* | 5/2009 | Liu | ...................... | G02F 1/13338 345/173 |
| 2010/0003502 A1* | 1/2010 | Nashiki | ..................... | B32B 7/02 428/328 |
| 2010/0265208 A1* | 10/2010 | Kim | ....................... | G06F 3/0412 345/174 |
| 2011/0008588 A1* | 1/2011 | Cheng | .................... | G06F 3/045 428/195.1 |
| 2015/0292964 A1* | 10/2015 | Sibbett | ..................... | B25J 19/02 73/862.632 |
| 2017/0010742 A1* | 1/2017 | Liu | ........................ | G06F 3/0416 |
| 2017/0329448 A1* | 11/2017 | Li | ......................... | G06F 3/0412 |
| 2019/0041281 A1* | 2/2019 | Li | ............................. | G01L 9/06 |

* cited by examiner

*Primary Examiner* — Stephen G Sherman
(74) *Attorney, Agent, or Firm* — Cooper Legal Group, LLC

(57) ABSTRACT

A pressure sensor and a display device are described. The pressure sensor includes a plurality of pressure units. Each of the pressure units includes four resistors having substantially the same resistance value. The four resistors form a Wheatstone bridge. Two resistors of the four resistors form a first resistor group. The other two resistors of the four resistors form a second resistor group. Orthogonal projections of electrodes of the two resistors of each of the resistor groups at least partially overlap in a direction perpendicular to a plane on which the pressure units are located. Extension directions of electrode patterns of the two resistors of each of the resistor groups are different.

13 Claims, 8 Drawing Sheets

PRESSURE SENSOR AND DISPLAY DEVICE

RELATED APPLICATIONS

This application claims priority to China Application Serial Number 201710044609.2, filed Jan. 21, 2017, which is herein incorporated by reference.

BACKGROUND

Technical Field

The present disclosure relates to touch technology. More particularly, the present disclosure relates to pressure sensors and display devices.

Description of Related Art

With the development of touch technology, most industrial electronic devices or consumer electronic devices adopt display devices with touch functions. A traditional display device only equipped with touch coordinate recognition functions can no longer satisfy customer's demands. In order to improve user experiences, including pressure sensors in a traditional display device to add a pressure sensing function has already become a trend.

A pressure sensor includes a plurality of pressure units configured to sense a touch position and a magnitude of pressure applied by a finger or a stylus. With the development of display devices and customer's demands, resolution requirements for pressure sensors have become increasingly high. As each pressure unit of a prior art pressure sensor occupies a large area, the number of pressure units per unit area of the pressure sensor is limited. Demands on high resolution and high accuracy pressure sensors thus cannot be satisfied.

For the foregoing reasons, there is a need to resolve the above-mentioned problems by providing a pressure sensor and a display device.

SUMMARY

In order to overcome the technical problems that the prior art pressure sensor has a low resolution and a low sensing accuracy, the present disclosure provides a pressure sensor and a display device.

An aspect of the present disclosure is directed to a pressure sensor. The pressure sensor comprises a plurality of pressure units. Each of the pressure units comprises four resistors having a same resistance value. The four resistors form a Wheatstone bridge. Two resistors of the four resistors are a first resistor group. Another two resistors of the four resistors are a second resistor group. Orthogonal projections of electrodes of the two resistors of each of the first resistor group and the second resistor group at least partially overlap in a direction perpendicular to a plane on which the pressure units are located. Extension directions of electrode patterns of the two resistors of each of the first resistor group and the second resistor group are different.

In some embodiments, the pressure sensor further comprises a substrate. The two resistors of each of the first resistor group and the second resistor group are respectively located on two opposite surfaces of the substrate.

In some embodiments, extension directions of electrode patterns of two adjacent resistors on a same surface of the substrate are different.

In some embodiments, the pressure sensor further comprises two substrates. The two substrates are a first substrate and a second substrate. The two resistors of the first resistor group are located on two opposite surfaces of the first substrate respectively. The two resistors of the second resistor group are located on two opposite surfaces of the second substrate respectively. The first substrate and the second substrate are stacked.

In some embodiments, a third substrate is disposed between the first substrate and the second substrate. Extension directions of electrode patterns of two resistors located between the first substrate and the second substrate are different.

In some embodiments, the first resistor group comprises first resistor and a second resistor. The second resistor group comprises a third resistor and a fourth resistor. Extension directions of electrode patterns of the first resistor and the third resistor are a first direction. Extension directions of electrode patterns of the second resistor and the fourth resistor are a second direction. The first direction and the second direction are perpendicular to each other.

In some embodiments, at least two of the pressure units are prearranged every square centimeter on the surfaces of the substrate.

In some embodiments, a plurality of through holes are formed in the substrate or the two substrates. The four resistors are electrically connected through the plurality of through holes to form the Wheatstone bridge.

In some embodiments, the substrate is a flexible printed circuit board.

In some embodiments, a thickness of the substrate ranges from 10 to 20 μm.

In some embodiments, an electrode material of the resistors is one of nickel, nickel-chromium alloy, and nickel-copper alloy.

Another aspect of the present disclosure is directed to a display device. The display device comprises the above pressure sensor and a display panel. The display panel comprises a light-emitting surface and a backlight surface. The pressure sensor is located on one side of the backlight surface.

As compared with the prior art, the pressure sensor in the present disclosure comprises a plurality of pressure units. The orthogonal projections of the electrodes of the two resistors of each of the resistor groups in each of the pressure units at least partially overlap. Hence, the area occupied by each of the pressure units on the pressure sensor can be decreased to raise the number of the pressure units per unit area of the pressure sensor, and the resolution of the pressure sensor is effectively increased. In addition, the extension directions of the electrode patterns of the two resistors of each of the resistor groups are different. The two resistors thus sense stresses in different directions, respectively, to improve the sensing accuracy of the pressure unit.

The present disclosure further provides a display device. The display device comprises the above pressure sensor. The pressure sensor has the advantages of high resolution and high sensing accuracy to enhance the product competitiveness of the display device.

It is to be understood that both the foregoing general description and the following detailed description are by examples, and are intended to provide further explanation of the invention as claimed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION OF THE EMBODIMENTS

In order to make the objects, technical solutions and advantages of the present disclosure more clear, the present disclosure will be further described in detail in the following with reference to the drawings and particular embodiments. It is to be noted that the following descriptions of embodiments of the present disclosure are presented herein for purpose of illustration and description only. It is not intended to be exhaustive or to be limited to the precise form disclosed.

Figure 1:
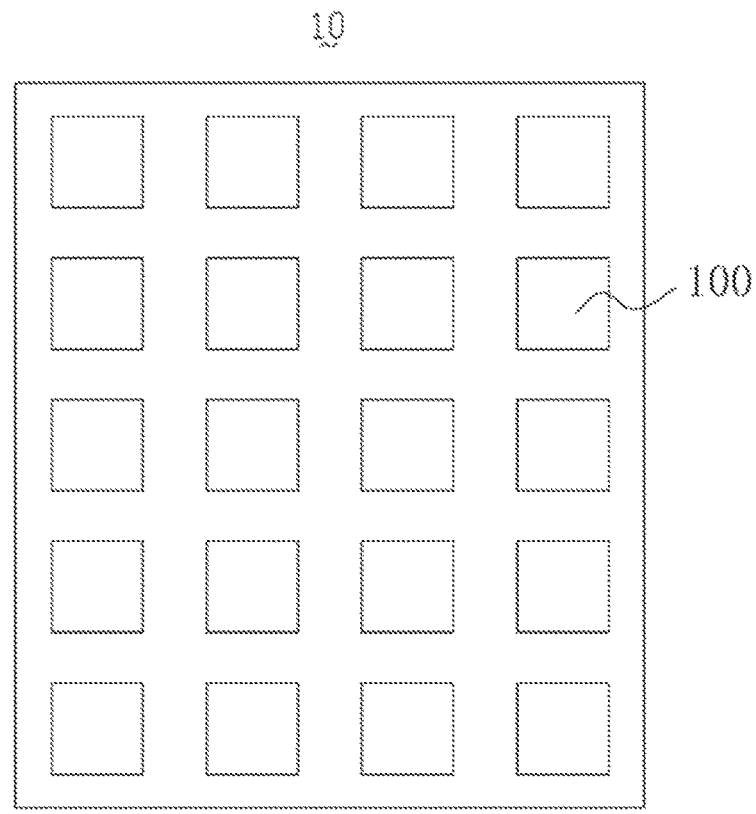
FIG. 1 is a schematic diagram of a structure of a pressure sensor according to at least one embodiment of the present disclosure.
Figure 2:
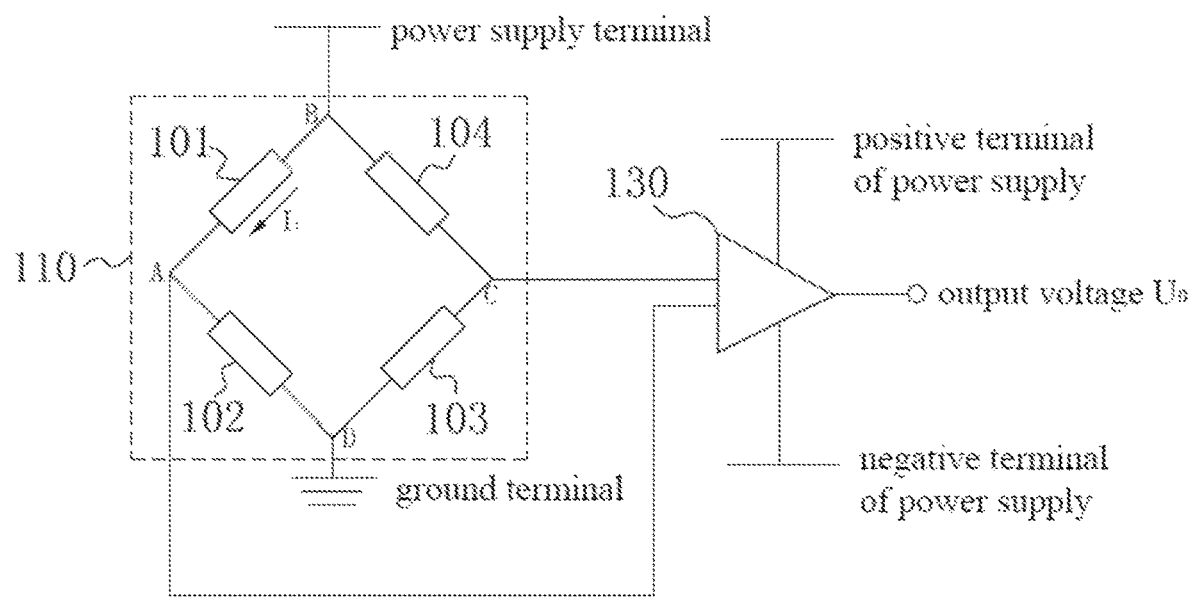
FIG. 2 is a schematic diagram of a principle of a Wheatstone bridge circuit according to at least one embodiment of the present disclosure.

As shown in FIG. 1 and FIG. 2, a pressure sensor 10 comprises a plurality of pressure units 100. Each of the pressure units 100 comprises four resistors having substantially the same electrical resistance. The four resistors (FIG. 2) are a first resistor 101, a second resistor 102, a third resistor 103, and a fourth resistor 104. The four resistors form a bridge 110 that is a Wheatstone bridge. The first resistor 101 and the second resistor 102 are connected in series. The third resistor 103 and the fourth resistor 104 are connected in series. The two serially connected circuits are then connected in parallel and form the bridge 110.

Further, a terminal B (electrically connected to the first resistor 101 and the fourth resistor 104) of the bridge 110 is electrically connected to a first power supply terminal. A terminal D (electrically connected to the second resistor 102 and the third resistor 103) of the bridge 110 is electrically connected to a ground terminal. A terminal A (electrically connected to the first resistor 101 and the second resistor 102) and a terminal C (electrically connected to the third resistor 103 and the fourth resistor 104) of the bridge 110 are electrically connected to an amplifier 130 to output signals. Power pins of the amplifier 130 may be connected to a positive power terminal ("positive terminal of power supply") and a negative power terminal ("negative terminal of power supply"), respectively.

When no pressing force is applied, the bridge 110 is in an equilibrium state. When the pressing force is applied, resistors in one or more bridges 110 near a pressed position deform so that resistance values change. The equilibrium of the bridges 110 is broken so that an output voltage $U_O$ changes. Different pressures correspond to different changes of the resistance values, and different output voltages $U_O$ are thus generated correspondingly. Hence, a pressure value can be obtained based on the output voltage $U_O$ correspondingly.

In greater detail, a resistance value of the first resistor 101 is $R_1$. A resistance value of the second resistor 102 is $R_2$. A resistance value of the third resistor 103 is $R_3$. A resistance value of the fourth resistor 104 is $R_4$. A voltage difference across two terminals of the first resistor 101 can be expressed as:

$$U_{AB} = I_1 R_1 = \frac{R_1}{R_1 + R_2} U_{BD} \quad (1)$$

A voltage difference across two terminals of the fourth resistor 104 can be expressed as:

$$U_{BC} = \frac{R_4}{R_3 + R_4} U_{BD} \quad (2)$$

The output voltage $U_O$ of the bridge can be expressed as:

$$U_O = U_{AB} - U_{BC} = \frac{R_1 R_3 - R_2 R_4}{(R_1 + R_2)(R_3 + R_4)} U_{BD} \quad (3)$$

As can be seen from equation (3), when $R_1 R_3 = R_2 R_4$, the output voltage $U_O$ of the bridge 110 is equal to zero. The bridge 110 is therefore in the equilibrium state.

Further, it is assumed that variations of resistances of bridge arms of the bridge 110 in the equilibrium state are $\Delta R_1$, $\Delta R_2$, $\Delta R_3$, and $\Delta R_4$, then the output voltage $U_O$ of the bridge 110 can be further expressed as:

$$U_O = U_{AB} - U_{BC} = \frac{(R_1 | \Delta R_1)(R_3 | \Delta R_3) (R_2 | \Delta R_2)(R_4 | \Delta R_4)}{(R_1 + \Delta R_1 + R_2 + \Delta R_2)(R_3 + \Delta R_3 + R_4 + \Delta R_4)} U_{BD} \quad (4)$$

If the equilibrium condition, $R_1 R_3 = R_2 R_4$, is substituted into the above equation (4), and insignificant terms are omitted by further considering that $\Delta R$ is much smaller than R, then the output voltage of the bridge 110 is:

$$U_0 = U_{BD} \frac{R_1 R_2}{(R_1 + R_2)^2} \left( \frac{\Delta R_1}{R_1} - \frac{\Delta R_2}{R_2} + \frac{\Delta R_3}{R_3} - \frac{\Delta R_4}{R_4} \right) \quad (5)$$

In the present disclosure, the resistance values of the resistors of the bridge 110 are equal, that is, $R_1=R_2=R_3=R_4=R$. Hence, the above equation (5) can further be expressed as:

$$U_0 = \frac{U_{BD}}{4} \left( \frac{\Delta R_1}{R_1} - \frac{\Delta R_2}{R_2} + \frac{\Delta R_3}{R_3} - \frac{\Delta R_4}{R_4} \right) \quad (6)$$

In greater detail, if the four resistors (the first resistor 101, the second resistor 102, the third resistor 103 and the fourth resistor 104) in the bridge 110 are all strain gauges, their sensitivities K are all substantially the same.

After being pressed by a finger, a relationship between a ratio of the variation of the resistance generated by a finger press to an initial resistance value of the corresponding resistor and a dependent variable of the resistor after the finger press is as follows:

$$\Delta R/R = K\varepsilon \quad (7)$$

By combining the above equations (6) and (7), the output voltage $U_O$ of the bridge 110 can be further expressed as:

$$U_0 = \frac{U_{ED} K}{4} (\varepsilon_1 - \varepsilon_2 + \varepsilon_3 - \varepsilon_4) \quad (8)$$

As can be seen from equation (8), the output voltage $U_O$ of the bridge 110 correlates with dependent variables of the four resistors.

Figure 3:
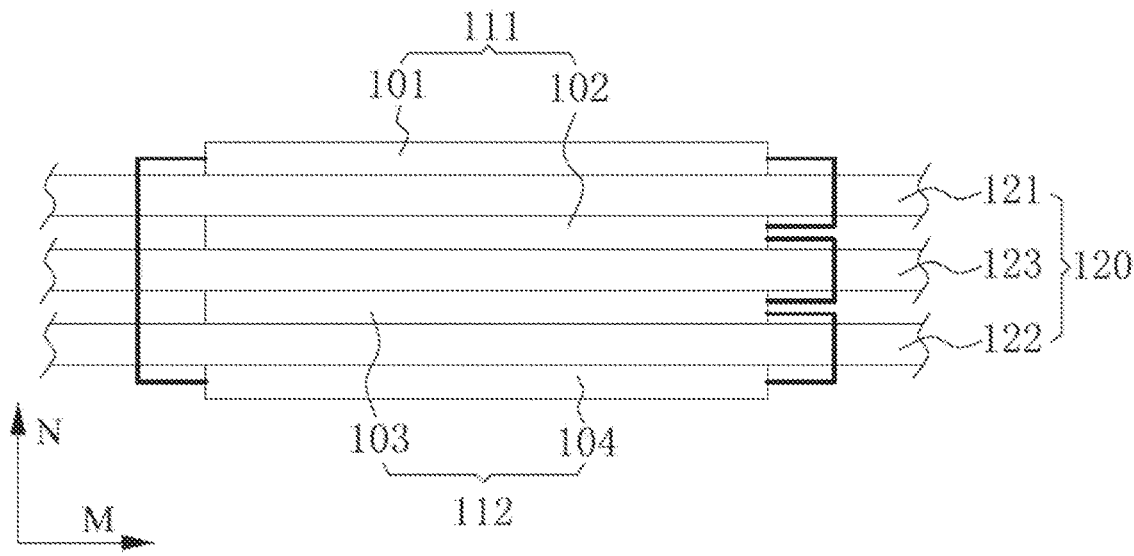
FIG. 3 is a schematic diagram of a structure of a pressure unit according to at least one embodiment of the present disclosure.
Figure 4:
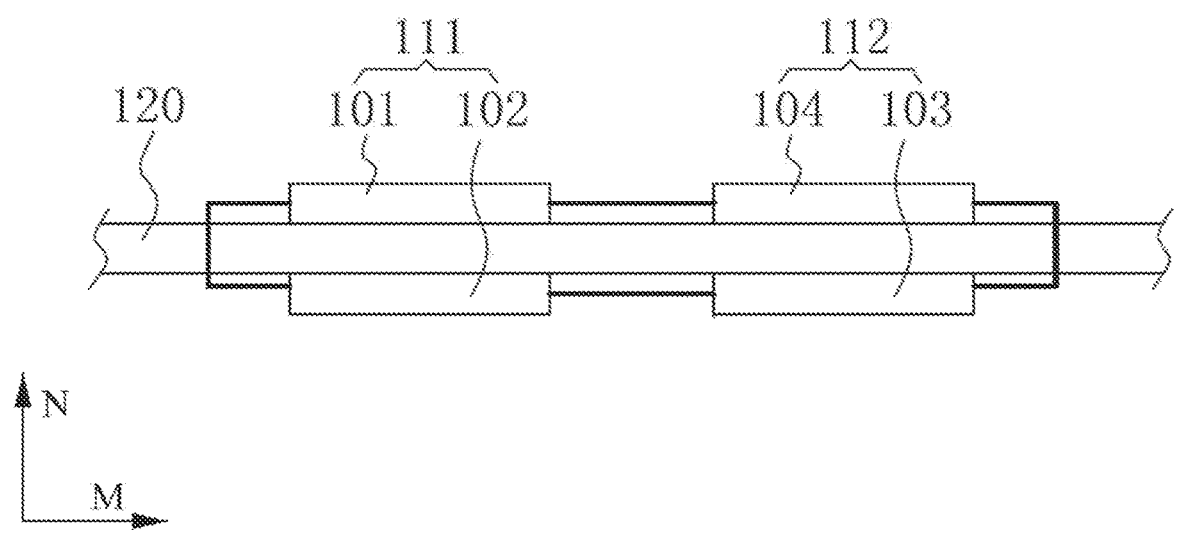
FIG. 4 is a schematic diagram of a structure of a pressure unit according to at least one embodiment of the present disclosure.

Reference is made to FIG. 3 and FIG. 4. A direction in parallel with a plane on which the pressure unit 100 is located, that is, the direction indicated by the M axis, is a horizontal direction. A direction perpendicular to the plane on which the pressure unit 100 is located, that is, the direction indicated by the N axis, is a vertical direction. In the direction perpendicular to the plane on which the pressure unit 100 is located (that is, in the direction indicated by the N axis shown in FIG. 3 and FIG. 4), orthogonal projections of electrodes of at least two resistors of the four resistors partially overlap or completely overlap. In this manner, an area occupied by each of the pressure units 100 on the pressure sensor 10 can be decreased to raise a number of the pressure units 100 per unit area of the pressure sensor 10. A resolution of the pressure sensor 10 is effectively increased.

A first two resistors of the four resistors are a first resistor group 111, and a second two resistors of the four resistors are a second resistor group 112. That is, the first resistor group 111 comprises the first resistor 101 and the second resistor 102, and the second resistor group 112 comprises the third resistor 103 and the fourth resistor 104. In some embodiments, orthogonal projections of electrodes of two resistors of each of resistor groups partially overlap or completely overlap in the direction perpendicular to the plane on which the pressure unit 100 is located (that is, in the direction indicated by the N axis shown in FIG. 3 and FIG. 4). In other words, as shown in FIG. 3 and FIG. 4, orthogonal projections of electrodes of the first resistor 101 and the second resistor 102 partially overlap or completely overlap. Orthogonal projections of electrodes of the third resistor 103 and the fourth resistor 104 partially overlap or completely overlap. Therefore, the first two and the second two resistors of the four resistors are respectively superimposed in the direction perpendicular to the plane on which the pressure unit 100 is located. As a result, the area occupied by each of the pressure units 100 on the pressure sensor 10 can be further decreased to raise the resolution of the pressure sensor 10. In some other embodiments, the orthogonal projections of the electrodes of the two resistors of each of the resistor groups completely overlap in the direction perpendicular to the plane on which the pressure unit 100 is located (that is, in the direction indicated by the N axis shown in FIG. 3 and FIG. 4). In other words, the orthogonal projections of the electrodes of the first resistor 101 and the second resistor 102 completely overlap in the direction perpendicular to the plane on which the pressure unit 100 is located (that is, in the direction indicated by the N axis shown in FIG. 3 and FIG. 4). The orthogonal projections of the electrodes of the third resistor 103 and the fourth resistor 104 completely overlap in the direction perpendicular to the plane on which the pressure unit 100 is located (that is, in the direction indicated by the N axis shown in FIG. 3 and FIG. 4).

As shown in FIG. 3, illustrating one embodiment, the pressure sensor 10 further comprises a substrate 120. The substrate 120 comprises a first substrate 121 and a second substrate 122. Two resistors of the first resistor group 111 are located on two opposite surfaces of the first substrate 121 respectively. Two resistors of the second resistor group 112 are located on two opposite surfaces of the second substrate 122 respectively. That is, the first resistor 101 and the second resistor 102 are on the two opposite surfaces of the first substrate 121 respectively. The third resistor 103 and the fourth resistor 104 are on the two opposite surfaces of the second substrate 122 respectively. The first substrate 121 and the second substrate 122 are stacked, that is, stacked in the direction indicated by the N axis. In the present embodiment, the first resistor group 111 stacked on the second resistor group 112 is taken as an example. Orthogonal projections of electrodes of the first resistor group 111 partially overlap or completely overlap orthogonal projections of electrodes of the second resistor group 112. That is, the orthogonal projections of the electrodes of the first resistor 101, the second resistor 102, the third resistor 103, and the fourth resistor 104 partially overlap or completely overlap in the direction indicated by the N axis. In the present embodiment, orthogonal projections of electrodes of the four resistors completely overlapping in the direction indicated by the N axis are taken as an example.

It should be understood that the electrodes of the four resistors partially overlap or completely overlap one another. The area of the pressure unit 100 is further decreased. Of course, most favorably, the electrodes of the four resistors substantially completely overlap one another. Under the circumstances, the area of the pressure unit 100 can be reduced by ¾. Unlike the prior art, a distribution density of the pressure units 100 on the pressure sensor 10 according to the present embodiment can be increased to four times the distribution density of other approaches. For example, the distribution density of the pressure units on the pressure sensor in other approaches is approximately 1 unit/cm². The distribution density of the pressure units 100 on the pressure sensor 10 according to the present embodiment can reach 4 units/cm². Of course, if two, three or more pressure units can be disposed per square centimeter of the pressure sensor in a single-sided bridge design (that is, the four resistors are on a same plane), eight, twelve or more pressure units 100 can be disposed per square centimeter of the pressure sensor 10 according to the present embodiment.

As shown in FIG. 4, to illustrate another embodiment, the pressure sensor 10 further comprises a substrate 120. Two resistors of each of resistor groups are respectively located on two opposite surfaces of the substrate 120. That is, orthogonal projections of electrodes of the first resistor group 111 and the second resistor group 112 in the N axis do not overlap. In other words, the first resistor group 111 and the second resistor group 112 are disposed in parallel. In greater detail, the first resistor 101 and the second resistor 102 are respectively located on two opposite surfaces of the substrate 120. The third resistor 103 and the fourth resistor 104 are respectively located on two opposite surfaces of the substrate 120. In this configuration, an area of the pressure unit 100 (FIG. 1) can be reduced by ½. Unlike the prior art, a distribution density of the pressure units 100 on the pressure sensor 10 according to the present embodiment can be increased to two times the distribution density of other approaches. For example, the distribution density of the pressure units on the pressure sensor in other approaches is approximately 1 unit/cm$^2$. The distribution density of the pressure units 100 on the pressure sensor 10 according to the present embodiment can reach 2 units/cm$^2$. Of course, if more pressure units can be disposed per square centimeter of the pressure sensor in a single-sided bridge design (that is, the four resistors are on a same plane) in other approaches, a number of pressure units 100 per square centimeter of the pressure sensor 10 according to the present embodiment can be raised correspondingly.

Hence, the distribution density of the pressure units 100 on the pressure sensor 10 according to the present disclosure is 2 units to 4 units/cm$^2$. That is, at least two pressure units 100 are disposed per square centimeter of the substrate 120 to increase the resolution of the pressure sensor 10 effectively.

In addition, a greater temperature gradient exists between four resistors in a horizontal direction in approaches using a single-sided bridge design in which the four resistors are on a same plane. In the pressure sensor 10 of the present disclosure, since at least two of the resistors are disposed in a vertical manner and a temperature gradient in a vertical direction is smaller, the influence of temperature on the bridge can be effectively avoided. As a result, the accuracy of pressure sensing can be effectively improved. The bridge here is the bridge 110. According to the embodiment shown in FIG. 3 and the embodiment shown in FIG. 4 of the present disclosure, the pressure unit 100 according to the embodiment shown in FIG. 3 has a smaller area but a greater thickness. The pressure unit 100 in the embodiment shown in FIG. 4 has a larger area but a smaller thickness. In practical applications, a selection may be made depending on design considerations.

Figure 5:
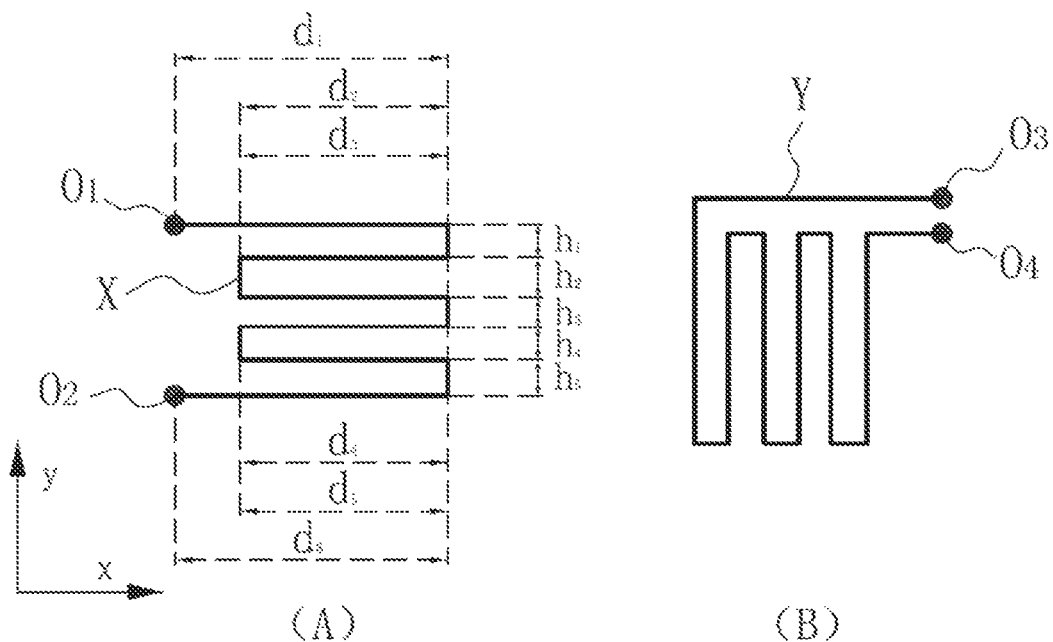
FIG. 5 is schematic diagrams of structures of electrode patterns of resistors according to at least one embodiment of the present disclosure.
Figure 6:
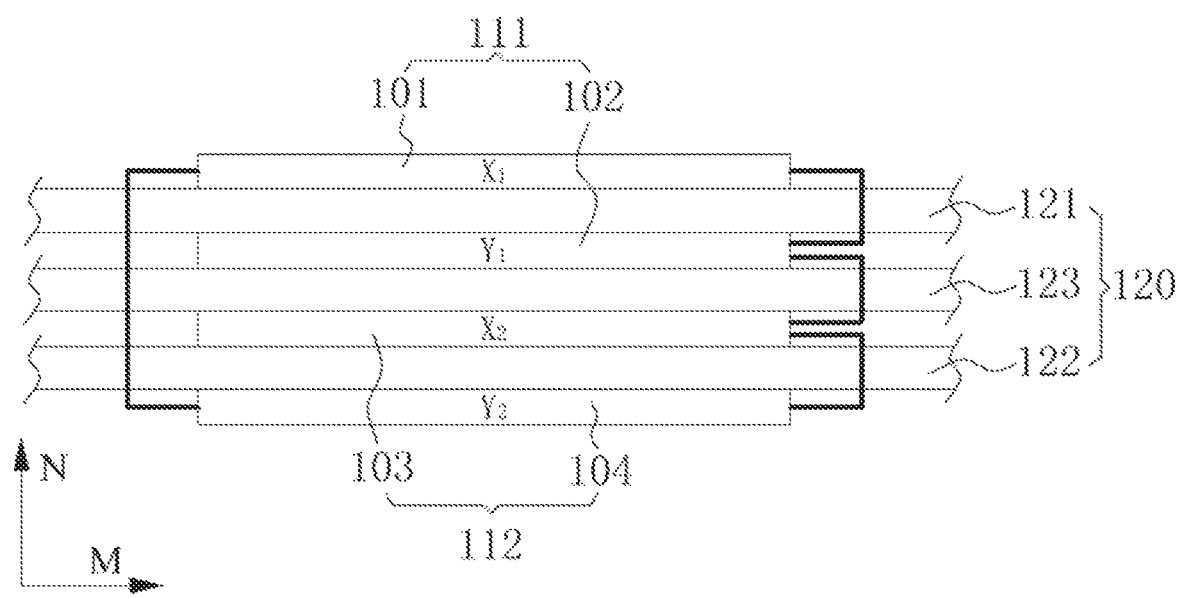
FIG. 6 is a schematic diagram of a structure of a pressure unit according to at least one embodiment of the present disclosure.
Figure 7:
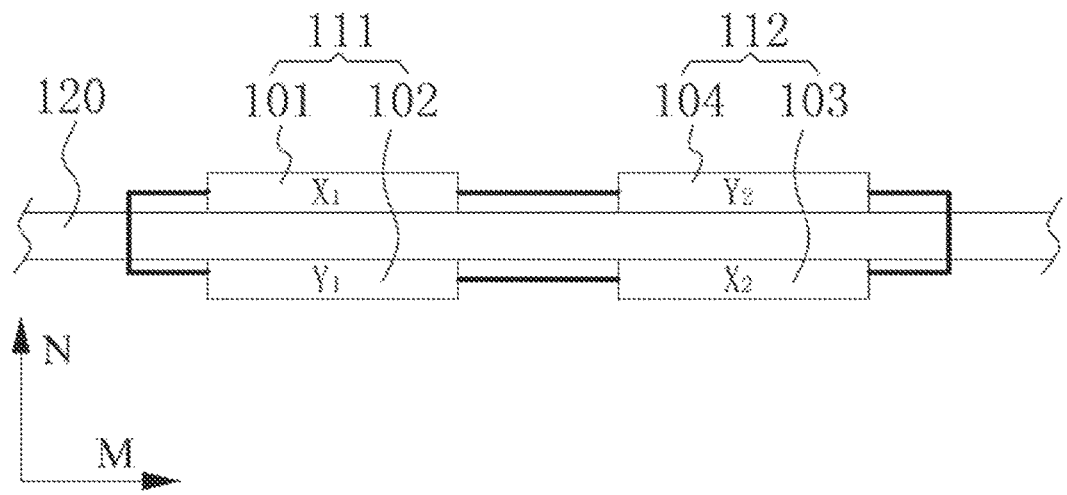
FIG. 7 is a schematic diagram of a structure of a pressure unit according to at least one embodiment of the present disclosure.

Reference is made to FIG. 5, FIG. 6, and FIG. 7. In some embodiments, extension directions of electrode patterns of two resistors of each resistor group are different. That is, extension directions of electrode patterns of two resistors of the first resistor group 111 are different, and extension directions of electrode patterns of two resistors of the second resistor group 112 are different. In other words, extension directions of electrode patterns of the first resistor 101 and the second resistor 102 are different. Extension directions of electrode patterns of the third resistor 103 and the fourth resistor 104 are different. In this manner, the electrodes partially overlap or completely overlap. That is, the two resistors disposed in a vertical manner respectively sense stresses in different directions so as to improve sensing accuracy. The extension direction referred to herein and in the following refers to that if a total projection length of the electrode pattern of the resistor in one direction is greater than a total projection length of the electrode pattern of the resistor in the other directions, the one direction being the extension direction of the electrode pattern of the resistor.

In greater detail, take FIG. 5 for example, a resistor shown in (A) of FIG. 5 is denoted as a resistor X. A total projection length of the resistor X comprises a total projection length d in a first direction (X direction) and a total projection length h in a second direction (Y direction). The resistor pattern in the first direction or the second direction is divided into a plurality of segments. The total projection length d in the first direction is equal to a sum of a segment d1, a segment d2, a segment d3, a segment d4, a segment d5, and a segment d6. The total projection length h in the second direction is equal to a sum of a segment h1, a segment h2, a segment h3, a segment h4 and a segment h5. As can be seen from (A) of FIG. 5, the total projection length d in the first direction is greater than the total projection length h in the second direction. Hence, an extension direction of the electrode pattern of the resistor X is the first direction. The resistor X has a first node O1 and a second O2 for electrical connection. A resistor shown in (B) of FIG. 5 is denoted as a resistor Y. Since a total projection length of the resistor Y in the second direction (Y direction) is the greatest, an extension direction of an electrode pattern of the resistor Y is the second direction. The resistor Y has a third node O3 and a fourth node O4 for electrical connection. The extension directions being different indicates that a non-zero angle is formed between the first direction and the second direction. In some other embodiments, the extension directions of the electrode patterns of the two resistors of each of the resistor groups are substantially perpendicular to each other. That is, the extension directions of the electrode patterns of the two resistors of the first resistor group 111 are substantially perpendicular to each other and the extension directions of the electrode patterns of the two resistors of the second resistor group 112 are substantially perpendicular to each other. In other words, the first direction is substantially perpendicular to the second direction.

In greater detail, as compared with the embodiment shown in FIG. 3, an embodiment shown in FIG. 6 is different in that the extension directions of the electrode patterns of the resistors are further limited. According to the present embodiment, in the first resistor group 111, the extension direction of the electrode pattern of the first resistor 101 is the first direction, that is, the resistor X1 (having configuration similar to the resistor X of FIG. 5). The extension direction of the electrode pattern of the second resistor 102 is the second direction, that is, the resistor Y1 (having configuration similar to the resistor Y of FIG. 5). In the second resistor group 112, the extension direction of the electrode pattern of the third resistor 103 is the first direction, that is, the resistor X2 (having configuration similar to the resistor X of FIG. 5). The extension direction of the electrode pattern of the fourth resistor 104 is the second direction, that is, the resistor Y2 (having configuration similar to the resistor Y of FIG. 5).

In some embodiments, a third substrate 123 is disposed between the first substrate 121 and the second substrate 122. Extension directions of electrode patterns of two resistors between the first substrate 121 and the second substrate 122 are different. That is, as shown in FIG. 6, the extension directions of the electrode patterns of the second resistor 102 and the third resistor 103 between the first substrate 121 and the second substrate 122 are different. First, the extension directions of the electrode patterns of the two resistors of each of the resistor groups are different. In other words, the extension directions of the electrode patterns of the first resistor 101 and the second resistor 102 are different, and the extension directions of the electrode patterns of the third resistor 103 and the fourth resistor 104 are different. Under the above basis, the extension directions of the electrode patterns of the second resistor 102 and the third resistor 103 are different. The extension directions of electrode patterns of any two adjacent resistors in the vertical direction are different. That is, in the first resistor group 111, the extension direction of the electrode pattern of the first resistor 101 is the first direction, that is, the resistor X1. The extension direction of the electrode pattern of the second resistor 102 is the second direction, that is, the resistor Y1. In the second resistor group 112, the extension direction of the electrode pattern of the third resistor 103 is the first direction, that is, the resistor X2. The extension direction of the electrode pattern of the fourth resistor 104 is the second direction, that is, the resistor Y2. In some embodiments, the first direction and the second direction are substantially perpendicular to each other.

The resistance values of the first resistor 101, the second resistor 102, the third resistor 103, and the fourth resistor 104 of the bridge 110 are substantially the same. In addition, it is assumed that resistance changes of the four resistors caused by a finger pressing force and a temperature change are also substantially the same. According to equation (7), $\Delta R/R = K\varepsilon$ (K is the sensitivity), it can be seen that relationships between the strains of the first resistor 101, the second resistor 102, the third resistor 103, and the fourth resistor 104 generated by the finger press can be expressed as: $\varepsilon_1 = \varepsilon_3 = \varepsilon_x$ and $\varepsilon_2 = \varepsilon_4 = \varepsilon_y$. Therefore, the above equation (8) can be further transformed into:

$$U_0 = \frac{U_{BD}K}{4}(\varepsilon_x - \varepsilon_y + \varepsilon_x - \varepsilon_y) = \frac{U_{BD}K}{2}(\varepsilon_x - \varepsilon_y) \qquad (9)$$

As can be seen from the above equation (9), the above voltage $U_{B\,D}$ can be obtained by measurement. K is a resistance sensitivity relating to a material of a metal wire. A strain in the first direction after of the bridge 110 is pressed is expressed as $\varepsilon_x$. A strain in the second direction after the bridge 110 is pressed is expressed as $\varepsilon_y$. Magnitudes of the strains can be obtained by measuring resistance strain gauges. It can be seen that the output voltages $U_0$ of the bridge 110 obtained from the above equation (9) correlates substantially with an absolute value of a difference between the strain $\varepsilon_x$ in the first direction and the strain $\varepsilon_y$ in the second direction after the finger press.

Therefore, when the first direction and the second direction are perpendicular to each other, stress directions of adjacent resistor patterns generated after the finger press are more focused to obtain larger strains (that is, the strain in the first direction $\varepsilon_x$ and the strain in the second direction $\varepsilon_y$). That is, a greater absolute value of the difference between the strain in the first direction $\varepsilon_x$ and the strain in the second direction $\varepsilon_y$ can be obtained, and the output voltages $U_0$ of the bridge 110 can be calculated. As a result, the pressure unit 100 can create a more sensitive reaction to a force generated by the finger press so as to improve the accuracy of the pressure sensor 10. In some embodiments, numbers of the pressure units 100 disposed in the first direction and the second direction of the pressure sensor 10 are different. In this manner, the problem in which the pressure units 100 are subjected to stresses in different directions and the strains thus caused are the same after the pressure sensor 10 is pressed by a finger, which in turn causes the output voltage $U_0$ before or after a finger press to not be effectively calculated, is avoided.

Figure 8:
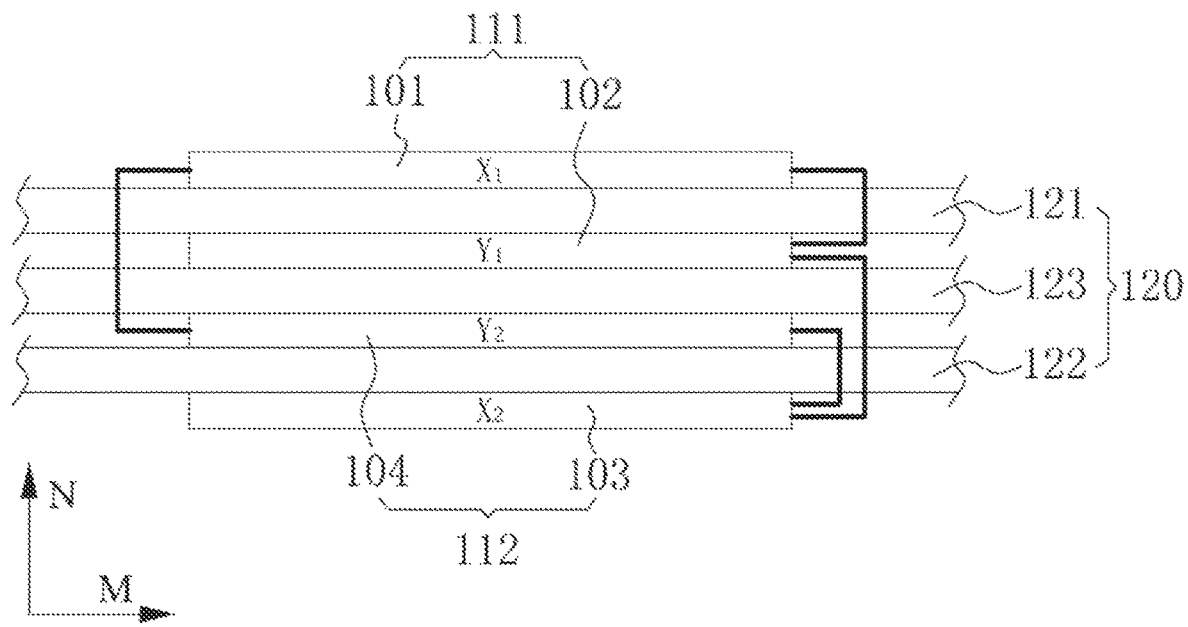
FIG. 8 is a schematic diagram of a structure of a modification of the pressure unit in FIG. 6.

As shown in FIG. 8, to serve as a modification of the pressure unit in FIG. 6, the extension directions of the electrode patterns of the two resistors between the first substrate 121 and the second substrate 122 may be the same. That is, the extension directions of the electrode patterns of the second resistor 102 and the fourth resistor 104 are the same. In other words, in the first resistor group 111, the extension direction of the electrode pattern of the first resistor 101 is the first direction, that is, the resistor X1. The extension direction of the electrode pattern of the second resistor 102 is the second direction, that is, the resistor Y1. In the second resistor group 112, the extension direction of the electrode pattern of the third resistor 103 is the first direction, that is, the resistor X2. The extension direction of the electrode pattern of the fourth resistor 104 is the second direction, that is, the resistor Y2. Relationships of electrical connections between the four resistors, that is, the first resistor 101, the second resistor 102, the third resistor 103, and the fourth resistor 104 remain unchanged. As compared with FIG. 2, only positions of the four resistors relative to one another are changed.

By comparing the pressure unit in FIG. 6 and its modification, that is, by comparing FIG. 6 and FIG. 8, it can be seen that not only are the sensing sensitivity of the pressure unit 100 and the accuracy of the pressure sensor 10 are higher, but the connections between the four resistors are simpler in the embodiment shown in FIG. 6 that serves as a preferred embodiment.

In greater detail, as compared with the embodiment shown in FIG. 4, an embodiment shown in FIG. 7 is different in that the extension directions of the electrode patterns of the resistors are further limited. According to the present embodiment, the two resistors of each of the resistor groups are respectively located on two opposite surfaces of the substrate 120. In some embodiments, extension directions of electrode patterns of two adjacent resistors on a same surface of the substrate 120 are different. In other words, as shown in FIG. 7, the extension directions of the electrode patterns of the first resistor 101 and the fourth resistor 104 are different, and the extension directions of the electrode patterns of the second resistor 102 and the third resistor 103 are different. In either the horizontal direction or the vertical direction, the extension directions of the electrode patterns of the two adjacent resistors are different. That is, the extension directions of the electrode patterns of the first resistor 101 and the fourth resistor 104 are different, and the extension directions of the electrode patterns of the first resistor 101 and the second resistor 102 are different. In other words, in the first resistor group 111, the extension direction of the electrode pattern of the first resistor 101 is the first direction, that is, the resistor X1. The extension direction of the electrode pattern of the second resistor 102 is the second direction, that is, the resistor Y1. In the second resistor group 112, the extension direction of the electrode pattern of the fourth resistor 104 is the second direction, that is, the resistor Y2. The extension direction of the electrode pattern of the third resistor 103 is the first direction, that is, the resistor X2.

Figure 9:
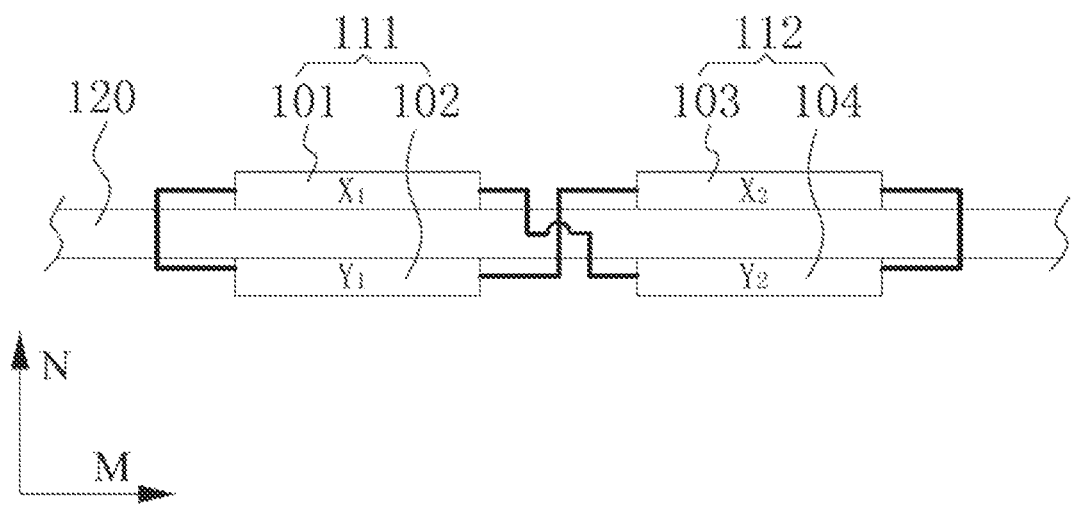
FIG. 9 is a schematic diagram of a structure of a modification of the pressure unit in FIG. 7.

As shown in FIG. 9, to serve as a modification of the pressure unit in FIG. 7, when the two resistors of each of the resistor groups are respectively located on two opposite surfaces of the substrate 120, the extension directions of the electrode patterns of the two resistors on the same surface of the substrate 120 may be the same. That is, the extension directions of the electrode patterns of the first resistor 101 and the third resistor 103 are the same, and the extension directions of the electrode patterns of the second resistor 102 and the fourth resistor 104 are the same. In other words, in the first resistor group 111, the extension direction of the electrode pattern of the first resistor 101 is the first direction, that is, the resistor X1. The extension direction of the electrode pattern of the second resistor 102 is the second direction, that is, the resistor Y1. In the second resistor group 112, the extension direction of the electrode pattern of the third resistor 103 is the first direction, that is, the resistor X2. The extension direction of the electrode pattern of the fourth resistor 104 is the second direction, that is, the resistor Y2. The relationships of electrical connections between the four resistors, that is, the first resistor 101, the second resistor 102, the third resistor 103, and the fourth resistor 104 remain unchanged. As compared with FIG. 2, only the positions of the four resistors relative to one another are changed.

By comparing the pressure unit in FIG. 7 and its modification, that is, by comparing FIG. 7 and FIG. 9, it can be seen that not only are the sensing sensitivity of the pressure unit 100 and the accuracy of the pressure sensor 10 higher, but the connections between the four resistors are simpler in the embodiment shown in FIG. 7 that serves as a preferred embodiment.

Figure 10:
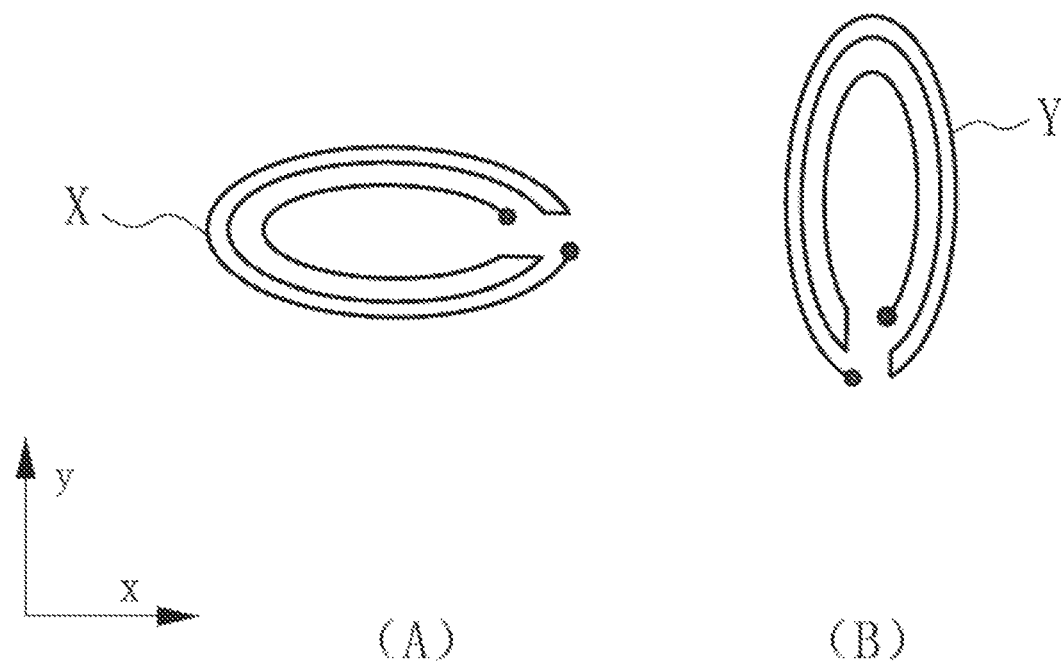
FIG. 10 is schematic diagrams of structures of a modification of the electrode patterns of the resistors in FIG. 5.
Figure 11:
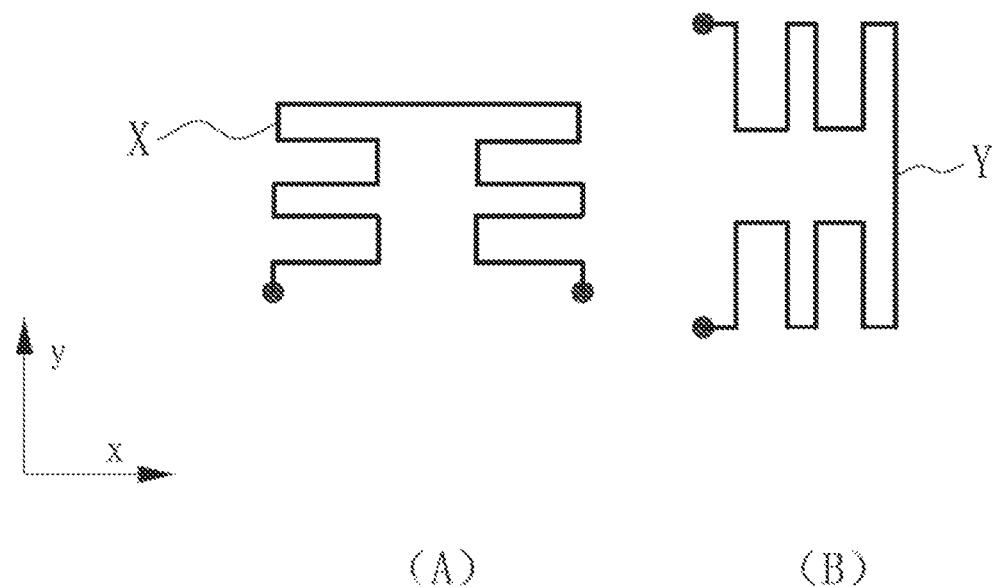
FIG. 11 is schematic diagrams of structures of another modification of the electrode patterns of the resistors in FIG. 5.
Figure 12:
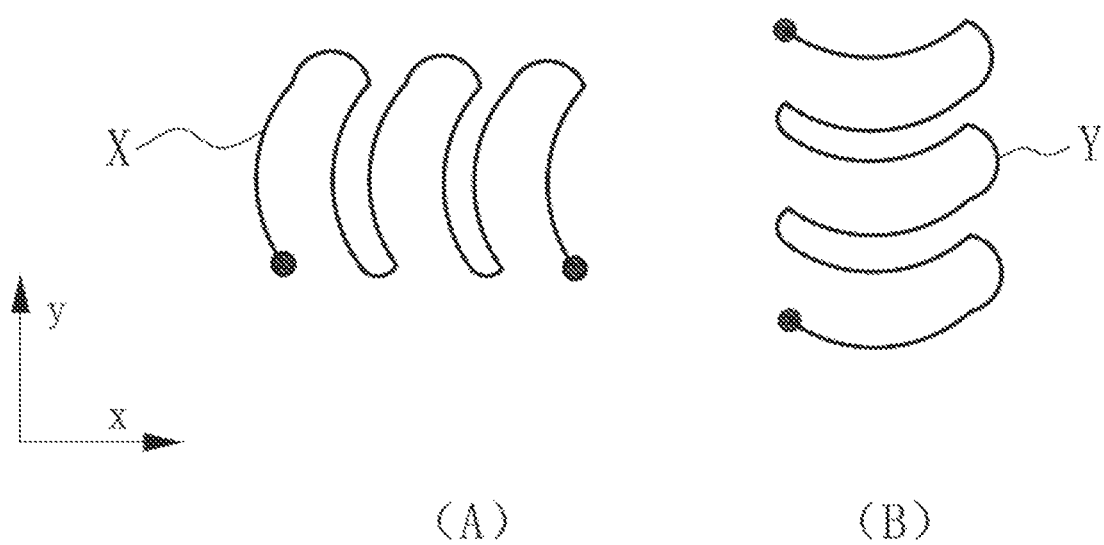
FIG. 12 is schematic diagrams of structures of still another modification of the electrode patterns of the resistors in FIG. 5.

In FIG. 5, the electrode patterns are in a comb-tooth configuration. To serve as a modification, the electrode patterns may be in an elliptical configuration as shown in FIG. 10. To serve as another modification, the electrode patterns may be in a "fenced" zigzag configuration as shown in FIG. 11, for example, forming a "three horizontal and one vertical" structure. To serve as still another modification, the electrode patterns may further be in a curve configuration as shown in FIG. 12. As long as the extension direction of the electrode patterns of the resistors X1, X2 (corresponding to the resistors X of the figures) is different from the extension direction of the electrode patterns of the resistors Y1, Y2 (corresponding to the resistors Y of the figures), it is within the scope of the present disclosure. In some embodiments, an electrode material of the resistors is one of nickel, nickel-chromium alloy, or nickel-copper alloy to reduce the production cost.

In some embodiments, as shown in FIG. 3, FIG. 4, and FIG. 6 to FIG. 9, a plurality of through holes (not shown in the figures) are formed in the substrate 120. The four resistors are electrically connected through the plurality of through holes to form the bridge 110. Generally speaking, the substrate 120 is a flexible printed circuit (FPC) board. Through an FPC perforation technology, the through holes can be formed to complete the connections between the resistors. There is no need to dispose extra leads so as to reduce the area occupied by the pressure units 100. In other words, an area where the pressure units 100 can be disposed is further expanded to raise the number of the pressure units 100 per unit area of the pressure sensor 10. The resolution of the pressure sensor 10 is effectively increased. In some other embodiments, wirings may be formed on the substrate 120.

In greater detail, since the extension directions of the electrode patterns of the resistors on two sides of the substrate 120 are different, the stresses in different directions can be sensed. Hence, even if the substrate 120 has a very small thickness, stresses in different directions still can be accurately sensed. In addition, since there is thermal conduction in the vertical direction, heat of the resistors in the first direction and the second direction can be cancelled out to avoid the influence of temperature on pressure sensing. The sensing accuracy is further improved.

A thickness of the substrate 120 ranges from 10 to 20 μm (micrometers), as compared with a regular pressure sensor, the substrate thickness is always greater than 100 μm. The thickness of the substrate 120 of the pressure sensor 10 according to the present disclosure can be reduced by more than 90%. Therefore, even if the pressure units 100 of the pressure sensor 10 are formed as a stacked structure, overall height of the stack is similar to or thinner than the regular pressure sensor, so that application in existing and future products is not limited thereby.

Figure 13:
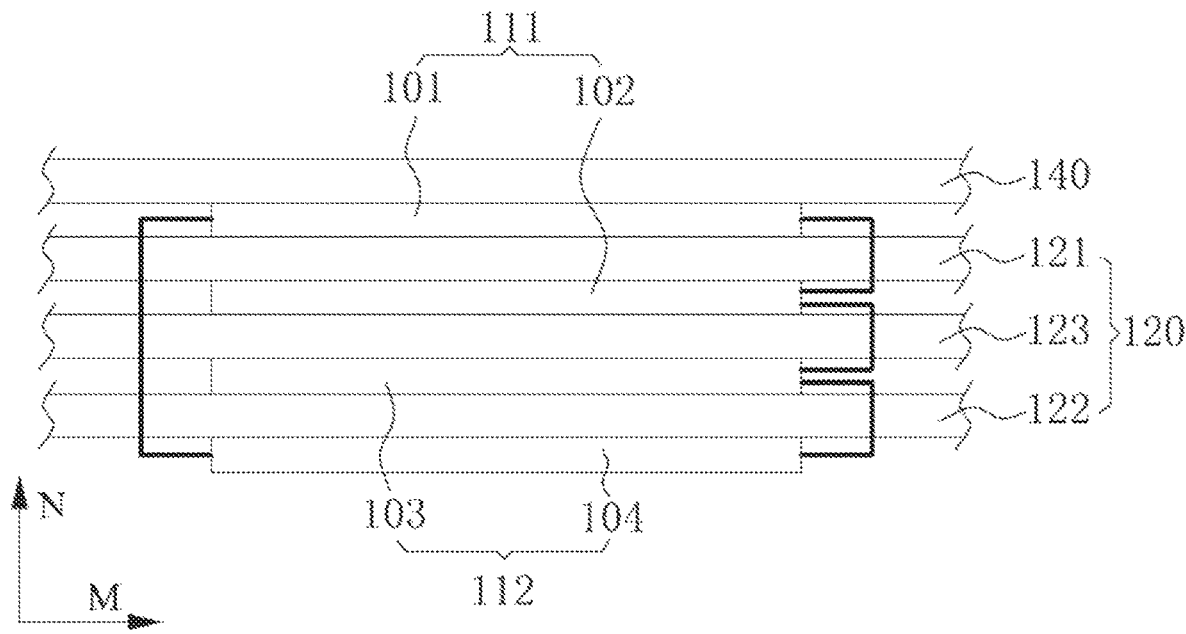
FIG. 13 is a schematic diagram of a structure of the pressure unit in FIG. 3 according to the present disclosure.
Figure 14:
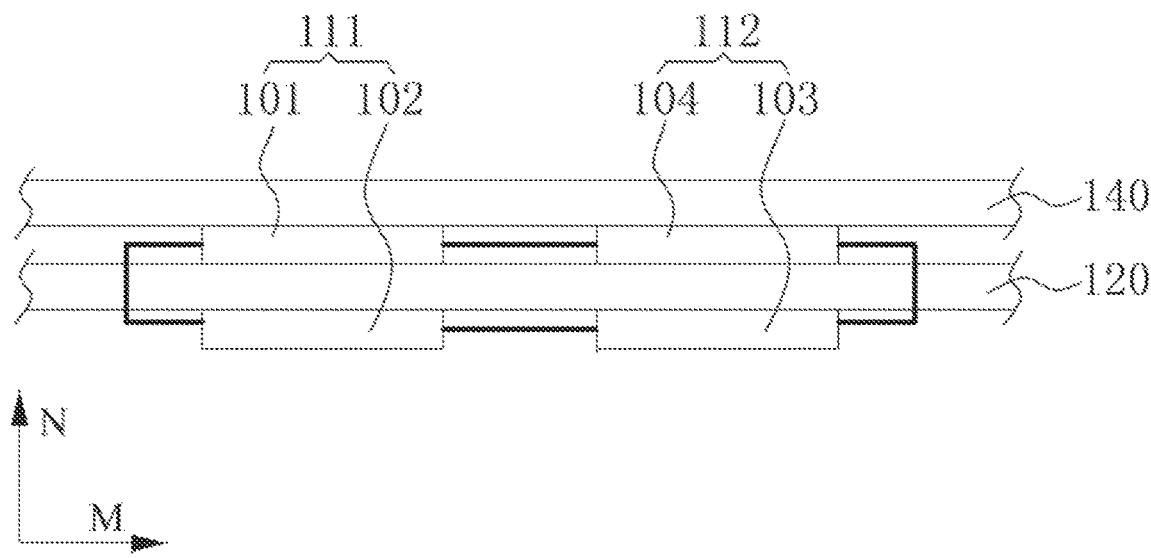
FIG. 14 is a schematic diagram of a structure of the pressure unit in FIG. 4 according to the present disclosure.

Description is provided with reference to FIG. 13 and FIG. 14. The pressure unit 100 further comprises a base plate 140 as a carrier. As shown in FIG. 13, to illustrate one embodiment, the base plate 140 for carrying is located on an outer side of the first resistor 101. Of course, the base plate 140 for carrying may be disposed on an outer side of the fourth resistor 104. The outer side herein refers to the side where the substrate 120 is not disposed. Selection of the electrode patterns of the resistors may be in accordance with the above description of FIG. 5, FIG. 10, FIG. 11, and FIG. 12.

As shown in FIG. 14, to illustrate another embodiment, the four resistors are divided into two layers in the vertical direction. The first resistor 101 and the fourth resistor 104 are located on one layer, and the second resistor 102 and the third resistor 103 are located on another one layer. The base plate 140 for carrying is located on an outer side of the first resistor 101 and the fourth resistor 104. Of course, the base plate 140 for carrying may be disposed on an outer side of the second resistor 102 and the third resistor 103. The outer side here refers to the side where the substrate 120 is not disposed. Generally speaking, the base plate 140 is a flexible printed circuit (FPC) board. A thickness of the base plate 140 ranges from 10 to 20 μm.

Figure 15:
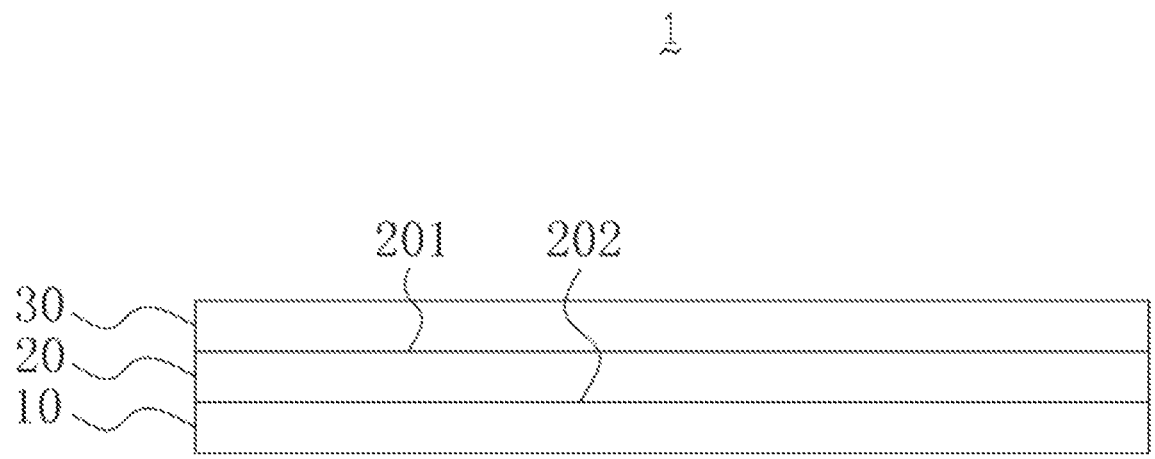
FIG. 15 is a schematic diagram of a structure of a display device according to at least one embodiment of the present disclosure.

As shown in FIG. 15, a display device 1 comprises the pressure sensor 10 provided by the embodiment shown in FIG. 1. In some embodiments, the display device 1 further comprises a display panel 20. The display panel 20 comprises a light-emitting surface 201 and a backlight surface 202. The pressure sensor 10 is located on one side of the backlight surface 202. The display panel may be an organic light-emitting diode (OLED) display panel, or may be a liquid crystal display (LCD) panel. Generally speaking, optical glass 30 is disposed on one side of the light-emitting surface 201. The function of the optical glass 30 is to protect the display panel 20 and the pressure sensor 10. Generally speaking, the optical glass 30 is touch panel (TP) cover glass.

As compared with other approaches, the pressure sensor according to the present disclosure comprises a plurality of pressure units. The orthogonal projections of the electrodes of the two resistors of each of the resistor groups in each of the pressure units at least partially overlap. Hence, the area occupied by each of the pressure units on the pressure sensor can be decreased to raise the number of the pressure units per unit area of the pressure sensor. The resolution of the pressure sensor is effectively increased. In addition, the extension directions of the electrode patterns of the two resistors of each of the resistor groups are different. The two resistors thus sense stresses in different directions, respectively, to improve the sensing accuracy of the pressure unit.

In greater detail, the pressure sensor further comprises a substrate. The two resistors of each of the resistor groups are respectively located on two opposite surfaces of the substrate. In this manner, the area of the pressure unit is larger but the thickness is smaller. In greater detail, the extension directions of the electrode patterns of the two resistors on a same surface of the substrate are different. In either the horizontal direction or the vertical direction, the extension directions of the electrode patterns of the two adjacent resistors are different to further improve the sensing accuracy of the pressure unit.

In greater detail, the pressure sensor further comprises two substrates, that is, the first substrate and the second substrate. The two resistors of the first resistor group are respectively located on two opposite surfaces of the first substrate, and the two resistors of the second resistor group are respectively located on two opposite surfaces of the second substrate. The first substrate and the second substrate are stacked. In this manner, the pressure unit has a smaller area but a greater thickness. In greater detail, the third substrate is disposed between the first substrate and the second substrate. The extension directions of the electrode patterns of the two resistors between the first substrate and the second substrate are different. In this manner, the extension directions of the electrode patterns of any two adjacent resistors in the vertical direction are different. As a result, the sensing accuracy of the pressure unit is further improved.

In greater detail, the first resistor group comprises the first resistor and the second resistor. The second resistor group comprises the third resistor and the fourth resistor. The extension directions of the electrode patterns of the first resistor and the third resistor are the first direction. The extension directions of the electrode patterns of the second resistor and the fourth resistor are the second direction. The first direction and the second direction are perpendicular to each other. In this manner, the strains are larger to further improve the sensing accuracy of the pressure unit.

In greater detail, at least two pressure units are disposed per square centimeter of the substrate to effectively increase the resolution of the pressure sensor.

In greater detail, a plurality of through holes are formed in the substrate. The four resistors are electrically connected through the plurality of through holes to form a Wheatstone bridge. The connections between the resistors are completed through the through holes. There is no need to dispose extra leads so as to reduce the area occupied by the pressure unit. In other words, the area where the pressure units can be disposed is further expanded to raise the number of the pressure units per unit area of the pressure sensor. The resolution of the pressure sensor is effectively increased.

In greater detail, the substrate is a flexible printed circuit (FPC) board. The FPC perforation technology is more mature to effectively reduce the production difficulty.

In greater detail, the thickness of the substrate ranges from 10 to 20 μm. The thickness of the substrate is smaller so that the pressure sensor has a very good application prospect.

In greater detail, the electrode material of the resistors is one of nickel, nickel-chromium alloy, and nickel-copper alloy, which can effectively reduce the production cost.

The present disclosure further provides a display device. The display device comprises the above pressure sensor and a display panel. The display panel comprises the light-emitting surface and the backlight surface. The pressure sensor is located on one side of the backlight surface. The pressure sensor has the advantage of high resolution so that it can be matched with a high-resolution display device to enhance the product competitiveness of the display device.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pressure sensor comprising: a plurality of pressure units, each pressure unit of the plurality of pressure units comprising:
   four resistors having a same resistance value and forming a Wheatstone bridge, wherein:
      a first resistor group comprises a first resistor and a second resistor of the four resistors,
      a second resistor group comprises a third resistor and a fourth resistor of the four resistors,
      the third resistor and the fourth resistor are different from the first resistor and the second resistor,
      orthogonal projections of the first resistor and the second resistor partially overlap and orthogonal projections of the third resistor and the fourth resistor partially overlap in a direction perpendicular to a plane on which the plurality of pressure units are located,
      extension directions of the first resistor and the second resistor are different, and
      extension directions of the third resistor and the fourth resistor are different;
      wherein the orthogonal projection of the first resistor partial overlaps with the orthogonal projections of the third resistor and the fourth resistor in the direction perpendicular to the plane on which the plurality of pressure units are located.

2. The pressure sensor of claim 1, further comprising:
   a first substrate; and
   a second substrate, wherein:
      the first resistor and the second resistor are located on opposite surfaces of the first substrate,
      the third resistor and the fourth resistor are located on opposite surfaces of the second substrate, and
      the first substrate and the second substrate are stacked.

3. The pressure sensor of claim 2, wherein at least two of the plurality of pressure units are arranged per square centimeter on the two opposite surfaces of the first substrate and on the two opposite surfaces of the second substrate.

4. The pressure sensor of claim 2, wherein:
   a plurality of through holes are formed in the first substrate and the second substrate, and
   the four resistors are electrically connected through the plurality of through holes to form the Wheatstone bridge.

5. The pressure sensor of claim 4, wherein at least one of the first substrate or the second substrate is a flexible printed circuit board.

6. The pressure sensor of claim 4, wherein a thickness of at least one of the first substrate or the second substrate ranges from 10 to 20 μm.

7. The pressure sensor of claim 2, further comprising a third substrate disposed between the first substrate and the second substrate, wherein:
   the second resistor and the third resistor are located between the first substrate and the second substrate, and
   the extension direction of the second resistor is different than the extension direction of the third resistor.

8. The pressure sensor of claim 1, wherein:
the extension direction of the first resistor and the extension direction of the third resistor are a first direction,
the extension direction of the second resistor and the extension direction of the fourth resistor are a second direction, and
the first direction is substantially perpendicular to the second direction.

9. The pressure sensor of claim 1, wherein an electrode material of at least one of the first resistor, the second resistor, the third resistor, or the fourth resistor is one of nickel, a nickel-chromium alloy, or a nickel-copper alloy.

10. A display device comprising:
the pressure sensor of claim 1; and
a display panel, wherein:
the display panel comprises a light-emitting surface and a backlight surface, and
the pressure sensor is located on one side of the backlight surface.

11. A pressure sensor comprising: a plurality of pressure units, each pressure unit of the plurality of pressure units comprising:
four resistors forming a Wheatstone bridge, wherein:
a first resistor and a second resistor of the four resistors are coupled in series,
a third resistor and a fourth resistor of the four resistors are coupled in series,
a first terminal of the first resistor and a first terminal of the fourth resistor are coupled to a power supply terminal,
a first terminal of the second resistor and a first terminal of the third resistor are coupled to ground, and
orthogonal projections of the first resistor and the second resistor partially overlap in a direction perpendicular to a plane on which the plurality of pressure units are located;
wherein the orthogonal projection of the first resistor partial overlaps with orthogonal projections of the third resistor and the fourth resistor in the direction perpendicular to the plane on which the plurality of pressure units are located.

12. The pressure sensor of claim 11, wherein orthogonal projections of the third resistor and the fourth resistor partially overlap in the direction perpendicular to the plane on which the plurality of pressure units are located.

13. The pressure sensor of claim 11, wherein extension directions of the first resistor and the second resistor are different.

* * * * *